United States Patent [19]

Bambrick

[11] 4,065,407
[45] Dec. 27, 1977

[54] PROCESS FOR PREPARING SHAPED PARTICLES FROM REHYDRATABLE ALUMINA

[75] Inventor: William Edward Bambrick, Old Greenwich, Conn.

[73] Assignee: American Cyanamid Company, Stamford, Conn.

[21] Appl. No.: 723,835

[22] Filed: Sept. 16, 1976

[51] Int. Cl.² .............................................. B01J 21/04
[52] U.S. Cl. ...................................... 252/463; 423/628
[58] Field of Search ................ 252/448, 463, 625, 628

[56] References Cited

U.S. PATENT DOCUMENTS

| | | | |
|---|---|---|---|
| 2,881,051 | 4/1959 | Pingard | 423/628 |
| 3,223,483 | 12/1965 | Osment | 252/463 X |
| 3,346,336 | 10/1967 | Hayes | 252/463 X |
| 3,558,508 | 1/1971 | Keith et al. | 252/448 X |
| 3,576,768 | 4/1971 | Kehl et al. | 252/463 X |
| 3,645,914 | 2/1972 | Rosinski et al. | 252/463 X |
| 3,714,313 | 1/1973 | Beiding et al. | 252/463 X |
| 3,853,789 | 12/1974 | Warthen et al. | 252/463 |

*Primary Examiner*—W. J. Shine
*Attorney, Agent, or Firm*—Robert F. Feltovic; Bruce F. Jacobs

[57] ABSTRACT

Disclosed is a process for preparing shaped alumina particles for catalysts or catalyst supports by passing droplets of an aqueous slurry of a rehydratable alumina composition through a shaping medium, such as a column of water-immiscible liquid. The alumina composition undergoes rehydration while being shaped as it passes through the shaping medium, and accordingly, firm, discrete alumina bodies are produced.

7 Claims, No Drawings

PROCESS FOR PREPARING SHAPED PARTICLES FROM REHYDRATABLE ALUMINA

The invention relates to the preparation of shaped alumina particles. In particular, it relates to forming shaped particles through utilization of a heated shaped medium. More particularly, it relates to an oil drop method for producing spherical alumina bodies from an alumina composition containing a substantial portion of a rehydratable form of alumina.

Various processes for preparing spherical aluminas previously have been proposed. One such prior method for producing such spherical shapes incorporates an oil drop procedure whereby drops of an aqueous slurry of alumina are dispersed into a water-immiscible suspending medium. Though seemingly simplistic in theory, the oil drop method has presented considerable practical operational problems. The prior art methods, exemplified by U.S. Pat. Nos. 2,620,314 and 3,558,508, primarily are directed to the use of an aqueous slurry of an alumina sol including various chemical agents, so that the sol will set to a gel within the time interval of spherical particle formation, while the alumina drops are passing through the column of water-immiscible liquid. Hence, the selection of the starting alumina composition is critical in order to obtain firmly formed particles that, in addition, will not dissolve or crack during later processing or use.

The present invention is directed to the use of a novel alumina composition in an oil drop formation method. Unlike the prior art advancements in this field, the present invention does not incorporate the use of outside chemical reagents to induce rheological changes; rather, the novelty rests in the alumina composition itself which is capable of forming firm spherical shapes independently through its own internal chemistry.

According to the principles of the present invention there is provided, in a method for producing shaped alumina particles suitable for use as catalysts and catalyst supports comprising preparaing an aqueous slurry of an alumina composition containing a substantial portion of a rehydratable alumina, shaping the alumina into desired form, rehydrating to the shaped alumina and curing and calcining the shaped alumina particles to produce catalyst and catalyst support material, an improvement comprising introducing said aqueous slurry of a rehydratable alumina composition to a shaping medium whereby the alumina is fashioned into a desired configuration, and applying heat to said shaping medium to rehydrate and harden the alumina while it is being subjected to the influence of the shaping medium.

A preferred medium for producing spherical alumina particles according to the invention uses an alumina composition including a substantial portion of a rehydratable alumina form. Such an alumina composition can be produced by flash calcining hydrated alumina, such as is generally made from bauxite ore using the Bayer process, to form a partially dehydrated, rehydratable product consisting of anhydrous alumina, lower hydrate forms of alumina, alumina monohydrate, and unreacted trihydrate. The rehydratable alumina composition which can be used in the present process may vary in composition. The rehydratable powder commonly can be characterized by its LOI (loss on ignition) and its RI (rehydration index). The LOI is determined by measurement of the amount of weight loss on heating the alumina powder at 1800° F. for 2 hours. The RI, which denotes the amount of rehydratable alumina present in the powder, is computed according to the formula:

$$RI = \frac{(\text{LOI after rehydration} - \text{LOI before rehydration})}{15 (100 - \text{LOI after rehydration})} 3700$$

In general, the preparation method for the rehydratable alumina consists of partially dehydrating alumina trihydrate by passing it through a flow of high temperature gas for a fraction of a second to several seconds. The composition of the resulting product varies according to the trihydrate feed rate, the particle size, the gas temperature, and the residence time of the particle in the gas stream. This rehydratable powder composition can be milled or ground to reduce the particle size and then mixed with water and formed. In the rehydratable alumina composition of the present invention LOI measurements in the general range of 3–15 are considered preferable. The rehydration index of the powder should be between 15 and 80, with a preferred range of 40 to 80. The formed alumina may be hardened or cured to increase crush strength. Steam treatment curing has been found to be preferable. The alumina forms are then dried and calcined.

A key feature of the rehydratable alumina composition is that an aqueous slurry of the composition requires no additional chemical reagents in order to harden into an isotropic solid while passing through the immiscible phase. A slurry with a solids content of about 50–60% has been found to be of a preferred consistency. Mere application of heat to the alumina in the presence of water serves to effectively rehydrate the rehydratable alumina form and accordingly harden the alumina sphere into a firm discrete particle. Temperatures in the range of about 80°–100° C. have been found to be preferable. The surface tension forces in the immiscible phase form the slurry drops into spheres, while, at the same time, the alumina is firmed by internal rehydration. An important aspect of the process is to control the droplet buoyancy and oil viscosity so that critical hardness is achieved while the drops are in free fall. Any suitable water-immiscible liquid which does not vaporize at the rehydration temperatures may be employed. While it is possible to use immiscible liquid which has a higher density than that of the formed alumina, it is preferred to use a liquid of lower density so that the formed alumina will free-fall to the bottom of the forming column rather than rise to the top thereof. A blend of polyterpene resin and mineral oil has been determined to a suitable immiscible phase of acceptable viscosity and density.

Spherical shaped alumina offers certain advantages and hence is preferred in various catalyst applications. The lack of sharp edges on the spheres reduces wear and handling problems. Also the spherical shape often permits more uniform packing and thereby reduces channeling tendencies in a reaction zone.

By utilizing the ability of the rehydratable alumina slurry to harden directly into a formed shape, a distinct energy saving advantage is obtained over other practiced forming techniques. For example, the energy intensive steps of mulling and extruding, essential steps in the formation of extrudates, can be totally obviated. Further, the nature of the forming process of the present invention yields a more nearly isotropic solid alumina particle which minimizes planes of weakness, rendering catalyst and catalyst support particles with higher crush strength and porosity equivalent to extrudates.

The following examples demonstrate preparation of catalysts and catalyst supports using the method of the present invention. They are not intended to be limiting but merely illustrative.

Preparation of An Aqueous Alumina Slurry

A suitable aqueous alumina slurry with a solids content of 50–60 can be prepared through a method including the utilization of an ion exchange resin for removing ionic impurities from the alumina prior to forming. Such a slurry was prepared by stirring 1262 g of a rehydratable alumina powder composition (LOI 9.7 RI 41, 0.15% $Na_2O$) into 1000 ml of ice chips to which water was added to fill the interstices. This resulted in a thick slurry at a temperature of 10° C. To the chilled slurry was introduced 100 ml of an ion exchange resin (Dowex 50 W-X 8, a sulfonated styrene divinyl benzene polymer) with a particle size of 20–50 mesh. An exotherm occurs as the resin removes ionic impurities and the slurry becomes less viscous. The pH of the slurry fell from 10.2 to 7.9 in 4 hours, accompanied by a temperature rise to about 20° C. The slurry, now quite fluid, was separated from the used ion exchange resin by screening the resin off on a 50 mesh screen. The ion exchanged alumina was analyzed at 0.03% $Na_2O$. The resultant aqueous alumina slurry has a solids content of 50.3%.

EXAMPLE I

An aqueous alumina slurry prepared as described in the procedure set forth above (solids content 50.3%) was observed to undergo rapid setting upon application of heat. In order to form the alumina into beaded shapes, droplets of the slurry formed from a small orifice 1.5 mm in diameter were dropped into an oil bath. The surface tension forces in the immiscible oil phase forms the slurry drops into spheres as the alumina passes through the oil bath. In order to rehydrate and harden the alumina as the beaded shapes are passing through the oil, the oil was heated to 80°–100° C. Critical hardness was achieved while the drops are suspended in free fall through the oil, so that sufficient strength developed before the drops reached the bottom of the oil container where they would otherwise tend to flatten out on impact. A blend of 80% poly terpene resin and 20% mineral oil was used as the immiscible phase. Droplet fall times in a 2–3 inch oil layer were in the 3–60 second range; this was quite sufficient for the development of firm formed beads capable for maintaining their shape. The beads then were cured in the oil for about another additional 3 hours. A catalyst support was made from these beads by subjecting them to drying and calcining treatments. The finished product exhibited the following properties:

| Particle Diameter | 0.19" |
| --- | --- |
| Particle Shape | generally "tear drop" |
| Crush Strength | 35 lbs. |
| Pore Structure* | |
| Pore Volume | 0.706 ml/g |
| Micro Pore Volume (105A radius) | 0.378 ml/g |
| Surface Area | 210 m²/g |

(*measured by mercury intrusion method)

An alternative approach to utilizing the present inventive concept accommodates the formation of extrudates. Instead of shaping beads through use of the surface tension forces in an immiscible phase, cylinders (or other preferred shapes) can be formed by forcing an aqueous alumina slurry through tubes. Application of heat to the tubes serves to rehydrate and harden the alumina as it is being formed. Accordingly, the shaped alumina is ejected from the tubes as rigid cylinders. The following example illustrates this embodiment of the invention.

EXAMPLE II

An aqueous alumina slurry was prepared according to the procedure set forth above. This slurry then was pumped by a Masterflex Variable Speed Tubing Pump, equipped with 0.02 inch ID vinyl tubing. A tubing transition was made to thin wall polytetrafluoroethylene tubing of 1/16 inch ID. The polytetrafluoroethylene tubing was arranged to extend 1 foot into an enclosure heated by atmospheric pressure steam. As the alumina slurry was pumped through this heated extrusion die, the heat caused it to harden inside the die and be ejected as a rigid cylinder. The pump rate was adjusted so as to produce cylinders of desired firmness upon leaving the die. Upon emerging from the die, the extrudates fell into a pool of 100° C. steam condensate at the bottom of the steam enclosure, where they were allowed to cure.

I claim:

1. In a method for producing shaped alumina particles suitable for use as catalysts and catalyst supporting comprising preparing an aqueous slurry of an alumina composition containing a substantial portion of a rehydratable alumina, shaping the alumina into desired form, rehydrating to harden the shaped alumina, and curing, drying, and calcining the shaped alumina particles to produce catalyst and catalyst support material, an improvement comprising introducing an aqueous slurry consisting essentially of water and an alumina containing a substantial portion of a rehydratable alumina to a shaping medium selected from
   a. a water immiscible phase into which droplets of said alumina slurry are introduced to be shaped by surface tension forces into a spherical beaded form, and
   b. tubing of desired cross-sectional size and shape to shape said alumina into extrudate form,
whereby the alumina is fashioned into a desired configuration, and applying heat to said shaping medium to rehydrate and harden the alumina while it is being subjected to the influence of the shaping medium.

2. The method of claim 1 wherein said shaping medium is a water immiscible phase into which droplets of said alumina slurry are introduced to be shaped by surface tension forces into a spherical beaded form.

3. The method of claim 1 wherein said shaping medium comprises tubing of desired cross sectional size and shape to shape said alumina into extrudate form.

4. The method of claim 1 wherein the solids content of said aqueous slurry of alumina is about 50 to 60 percent.

5. The method of claim 4 wherein the alumina composition used to prepare said aqueous slurry is an alumina powder having a rehydration index of about 40 to 80.

6. The method of claim 2 wherein said immiscible phase in a mineral oil - poly terpene resin mixture heated to a temperature of about 80° to 100° C.

7. The method of claim 3 wherein steam heat is applied to said shaping medium.

* * * * *